(12) United States Patent
White et al.

(10) Patent No.: US 8,646,106 B2
(45) Date of Patent: Feb. 4, 2014

(54) LIMITED PLAY OPTICAL ARTICLE

(75) Inventors: James Mitchell White, Niskayuna, NY (US); Marc Brian Wisnudel, Clifton Park, NY (US); Kasiraman Krishnan, Clifton Park, NY (US); Mark Rogers Johnson, Pasadena, CA (US)

(73) Assignee: NBCUniversal Media, LLC, New York, NY (US)

( * ) Notice: Subject to any disclaimer, the term of this patent is extended or adjusted under 35 U.S.C. 154(b) by 1640 days.

(21) Appl. No.: 11/864,548

(22) Filed: Sep. 28, 2007

(65) Prior Publication Data

US 2009/0086587 A1 Apr. 2, 2009

(51) Int. Cl.
*G06F 21/00* (2013.01)

(52) U.S. Cl.
USPC ............. 726/31; 713/175; 709/217; 709/219; 705/21; 370/429; 726/27; 726/30

(58) Field of Classification Search
USPC .......................................................... 726/31
See application file for complete search history.

(56) References Cited

U.S. PATENT DOCUMENTS

| | | |
|---|---|---|
| 4,374,001 A | 2/1983 | Bernier |
| 4,444,626 A | 4/1984 | Bernier et al. |
| 4,918,317 A | 4/1990 | Hess et al. |
| 5,141,622 A | 8/1992 | Fauteux et al. |
| 5,451,932 A | 9/1995 | Wunderlich et al. |
| 5,491,262 A | 2/1996 | Hung |
| 5,559,983 A | 9/1996 | Masood |
| 5,699,047 A | 12/1997 | Tsai et al. |
| 5,815,484 A | 9/1998 | Smith et al. |
| 5,963,536 A | 10/1999 | Vasic et al. |
| 6,633,853 B2 | 10/2003 | Oshima et al. |
| 6,790,501 B2 * | 9/2004 | van de Grampel et al. .. 428/64.1 |
| 6,795,464 B2 | 9/2004 | Lawandy |
| 6,902,111 B2 | 6/2005 | Han et al. |

(Continued)

FOREIGN PATENT DOCUMENTS

| | | |
|---|---|---|
| WO | 98/40930 A1 | 9/1998 |
| WO | 2004/095447 A1 | 11/2004 |

OTHER PUBLICATIONS

Optical probes and techniques for molecular contrast enhancement in coherence imaging|http://biomedicaloptics.spiedigitallibrary.org/article.aspx?articleid=1102039|Boppart et al.|Jul.-Aug. 2005|pp. 041208-1 to 041208-4|vol. 10(4).*

(Continued)

*Primary Examiner* — Mahfuzur Rahman
(74) *Attorney, Agent, or Firm* — Fletcher Yoder, P.C.

(57) ABSTRACT

An optical article for playback in a player includes a first file comprising a first control logic; and a second file comprising a second control logic. The first file is configured to direct the player to play a first content data stored on the optical article, when the first control logic is read by the player. The player is directed to read the second file if the player cannot read the first file. The second file is configured to direct the player to play a second content data stored on the article when the second control logic is read by the player. The optical article includes a mark containing an optical state change material disposed on at least a portion of the first file, wherein the mark is in one of a first optical state or a second optical state, and wherein the first control logic can be read only when the mark is in the second optical state.

17 Claims, 4 Drawing Sheets

(56) References Cited

U.S. PATENT DOCUMENTS

| | | | |
|---|---|---|---|
| 6,990,671 B1 | 1/2006 | Evans et al. | |
| 7,124,944 B2* | 10/2006 | Selinfreund et al. | 235/454 |
| 7,127,066 B2 | 10/2006 | Solomon et al. | |
| 7,315,946 B1* | 1/2008 | Blumenfeld et al. | 713/175 |
| 7,362,956 B2 | 4/2008 | Akita et al. | |
| 7,444,296 B1 | 10/2008 | Barber et al. | |
| 7,653,919 B2* | 1/2010 | Potyrailo et al. | 720/718 |
| 7,831,577 B2* | 11/2010 | Goto et al. | 707/705 |
| 2002/0163479 A1 | 11/2002 | Lin et al. | |
| 2003/0081521 A1* | 5/2003 | Solomon et al. | 369/53.21 |
| 2004/0022542 A1 | 2/2004 | Atkinson | |
| 2004/0054594 A1 | 3/2004 | Forster et al. | |
| 2004/0120236 A1 | 6/2004 | Suzuki et al. | |
| 2005/0110978 A1 | 5/2005 | Potyrailo et al. | |
| 2005/0167510 A1 | 8/2005 | Potyrailo et al. | |
| 2006/0002269 A1 | 1/2006 | Bourget et al. | |
| 2006/0028924 A1 | 2/2006 | Atkinson | |
| 2006/0114755 A1 | 6/2006 | Eklund, II | |
| 2006/0132309 A1 | 6/2006 | Posamentier | |
| 2006/0159266 A1 | 7/2006 | Chavanne et al. | |
| 2006/0177768 A1 | 8/2006 | Tauchi et al. | |
| 2006/0227696 A1* | 10/2006 | Smith et al. | 369/275.1 |
| 2006/0234003 A1 | 10/2006 | Selinfreund | |
| 2007/0024948 A1 | 2/2007 | Hirano et al. | |
| 2007/0070867 A1 | 3/2007 | Forster et al. | |
| 2007/0115762 A1* | 5/2007 | Wisnudel et al. | 369/13.56 |
| 2007/0116920 A1 | 5/2007 | Krishnan et al. | |
| 2007/0116988 A1 | 5/2007 | Wisnudel et al. | |
| 2007/0143774 A1* | 6/2007 | Agrawal et al. | 720/738 |
| 2007/0201502 A1* | 8/2007 | Abramson | 370/429 |
| 2009/0249381 A1 | 10/2009 | White et al. | |
| 2009/0285074 A1 | 11/2009 | Wisnudel et al. | |
| 2009/0285075 A1 | 11/2009 | Wisnudel et al. | |
| 2009/0316565 A1 | 12/2009 | Hershey et al. | |

OTHER PUBLICATIONS

Taylor, J., Johnson, M., Crawford, C.G., "DVD Demystified", 3rd Ed., McGraw-Hill; 2006, Chapter 7-1 to 7-30 and Chapter 9- 1 to 9-33. (65 pages).

Labarge, R., "DVD Authoring and Production", CMP Books; 2001, pp. 30-37, 198-221, 452-453. (36 pages).

White, R., "How Computers Work", Millennium Ed., Que Corporation, Indianapolis, IN, 1999.

* cited by examiner

LIMITED PLAY OPTICAL ARTICLE

BACKGROUND

The invention relates generally to an optical article for playback in a player. More particularly the invention relates to a printing and authoring method in an optical article.

The popularity of optical articles, such as for example, compact discs (CD) and digital versatile discs (also known as digital video discs, or DVD), has grown rapidly since its introduction. When compared to other competitive storage media types, the accessibility of data, fidelity, low manufacturing cost, reduced size and other features have made optically-readable media, such as CDs and DVDs, an overwhelming choice for manufacturers and users alike. As a result, a great variety of information may be stored on the optical articles, such as for example, copyrighted content like feature films, advertisements, audio or video trailers, and others.

Limited play optical articles known in the art provide limited access to the complete content contained in the optical articles. It is desirable however to have a limited play optical article, where part of the content may have unlimited access i.e., accessible throughout the lifetime of the optical article, and a part of the content may have limited access.

Accordingly, there remains a need for an improved solution to the long-standing problem. The method described herein fills this need by employing a printing and authoring method that will permit the introduction of limited and unlimited access content in a DVD.

BRIEF DESCRIPTION

One embodiment of the present disclosure is directed to an optical article for playback in a player. The optical article includes a first file comprising a first control logic; and a second file comprising a second control logic. The first file is configured to direct the player to play a first content data stored on the optical article, when the first control logic is read by the player. The player moves on to read the second file if the player cannot read the first file. The second file is configured to direct the player to play a second content data stored on the article when the second control logic is read by the player. The optical article includes a mark containing an optical state change material disposed on at least a portion of the first file, wherein the mark is in one of a first optical state or a second optical state, and wherein the first control logic can be read only when the mark is in the second optical state.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
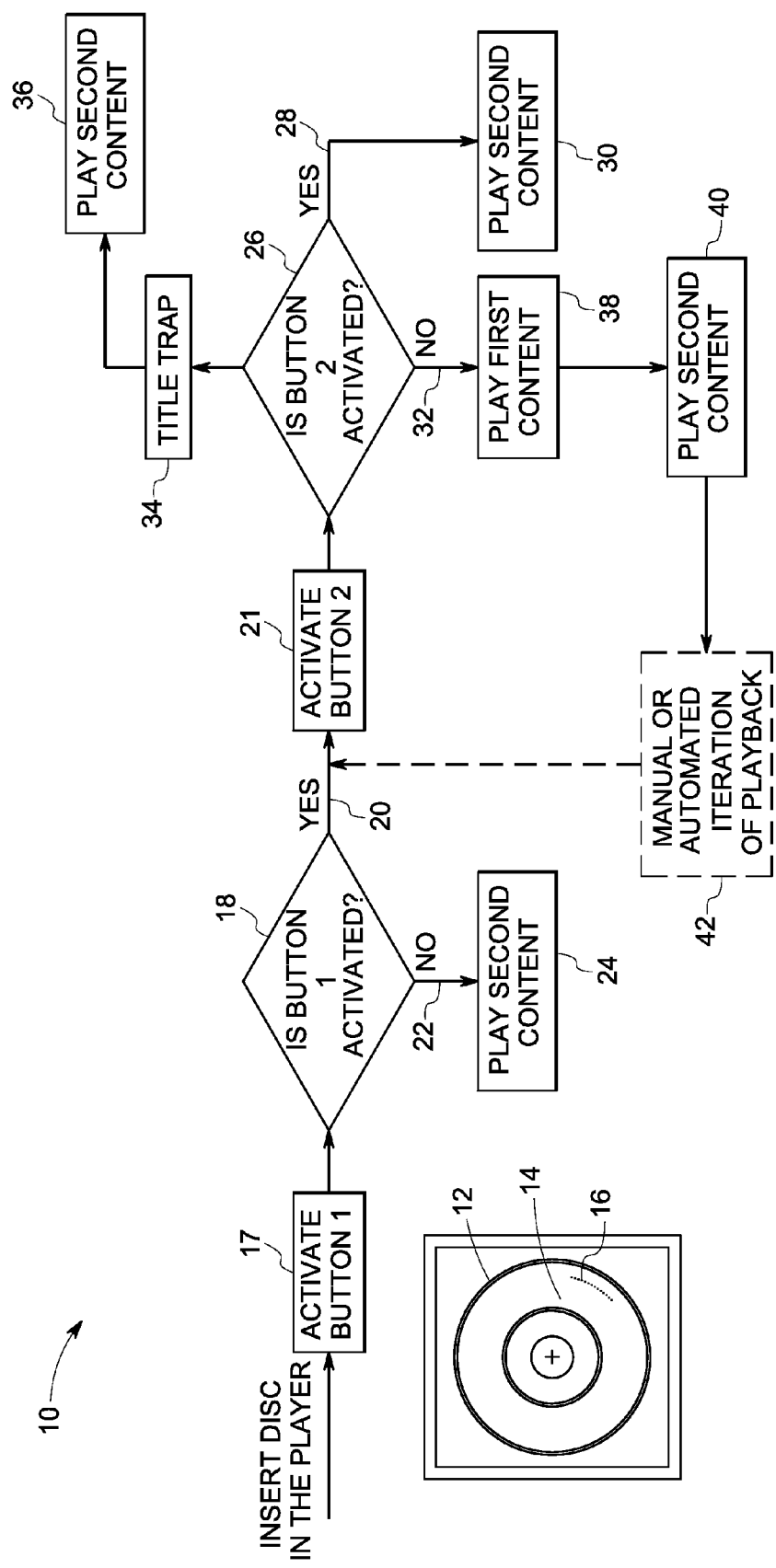
FIG. 1 shows a logical layout of content in an optical article in accordance with an embodiment described herein.

The invention relates generally to an optical article for playback in a player. More particularly the invention relates to a printing and an authoring method in an optical article.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise.

One embodiment of the present disclosure is directed to an optical article for playback in a player. The optical article includes at least one sector comprising a first control logic configured to set the value of a first register, the first register having a default value before it is set, and a non-default value after it is set, and a first command to be read sequentially after the sector. The first command is configured to direct the player to play a first content on the article if the first register is set to the default value and to direct the player to play a second content on the article if the first register is set to the non-default value. The optical article includes a mark containing an optical state change material disposed on the sector, wherein the mark is in one of a first optical state or a second optical state, and wherein the first control logic can be read only when the mark is in the second optical state.

The default value of the first register may be set when the optical article is inserted in a player. The first control logic is configured to set the non-default value of the first register under a Forced Activation (FOAC) method. The FOAC method utilizes the menu commands on the player to activate the first control logic resulting in the player changing the first register values during playback of the optical article. The register values are also known as the General Parameter (GPRM) registers. The player reaches a branch point on the disc and may be forced to make a logical decision to play the first content or the second content on the optical article, based on the value of the GPRM registers as set by the first control logic. In one embodiment, the first content may include an advertisement, an audio trailer, a video trailer, a promotional video, and a short feature. In one embodiment, the second content may include a video, such as for example, a movie, a promotional video, an additional advertisement, and a trailer. In one embodiment, the first content and the second content may be the same.

Each GPRM register is typically an unsigned 16-bit quantity or 2 bytes of storage, corresponding to the range of from about 0 to about 70000. Each GPRM register contains a value that can be modified under program control to create complex branching in the playback of the optical article. GPRM register values can be calculated during playback, and the appropriate navigation decisions may be taken based upon the computed result. A set GPRM command performs an arithmetic or bitwise calculation based on a source and a destination. The result is stored in the destination, which is the GPRM register.

Typically, GPRM registers and navigation commands are defined in conventional DVD players. Every video piece on a DVD falls under a program chain logical structure. In a DVD, a program chain (PGC) is a collection of programs, or groups of cells, linked together to form a sequential presentation. The navigation commands defined by the DVD may be used by a DVD developer to control reading and playback of content data stored on the DVD through logic control commands (i.e., control software) stored in the pre-command, post-command, cell-command and button-command areas in the DVD.

A pre-command is a navigation command that may be executed before the presentation of a PGC has been started. An example of a pre-command use would be for the player to decide to play in French language while playing video from a PGC. This would be done via a pre-command on that PGC, and the decision would be based on a GPRM register that was set by the user at a previous time to play the movie in French. The pre-command orders the player to check the value of the GPRM then makes a navigation decision, such as for example, to use the French audio stream during playback of the PGC. In various embodiments, the pre-command may be used to select the default audio language based upon region setting or control access by prompting for passwords.

A post-command is a navigation command that is to be executed just before the presentation of a PGC has been completed. As discussed above for the pre-command, the post-command may also be based on a GPRM value that has been set previously.

A cell-command is a navigation command that may be executed when the presentation of a cell has been completed. A cell is a unit of a video stored on the optical article, and may be anywhere from a fraction of a second to more than two hours long. Cells allow the video to be grouped for sharing content among titles, interleaving for multiple angles, etc. So a cell command is like a pre- or post-command, but is executed in the middle of the PGC but at the end of a cell within that PGC.

Pre-command, post-command, and cell-command may be only execute commands. These commands may be considered as execute command as they may not allow for user input at the time of the navigation command. They allow decisions to be made by the player during playback of the video. According to the DVD specifications, these commands may be located in sectors that also contain critical navigation data for the PGC. So if these commands may be covered by a mark that may at least partially obscure these commands, the player may not be able to navigate through the PGC via these commands.

Button commands are navigation commands that may be associated with the menu buttons in the DVD and executed whenever the viewer activates the button. Only a single navigation command can be associated with a menu button. Button commands are distinctly different from the above commands; they are embedded in a video stream and thus they can be isolated from critical data to allow for continuous video playback. For example, while playing the main menu, the player can be showing a short video sequence. As soon as the viewer selects a button, then the player immediately moves on to the start of the movie or the special feature. A button command is the only command that can take input directly from a user. Button commands can be used to set GPRM registers so later, during the playback of the video, the playback goes as the user specifies for instance, as described in the French audio stream example above.

A FOAC method as described herein is a subset of a button command. In this case, the player initiates its own button activation. As discussed in detail below the FOAC may be used to command the player to change a GPRM register. The GPRM register value may then be checked later using the pre-command to execute the desired navigation i.e., to play the first content or the second content contained in the DVD.

In one embodiment, the first content may contain a video object (VOB) file. Navigation commands may be embedded within the VOB file by defining them as button commands. In another embodiment, the first control logic may be embedded in the VOB file. A button may set a bit in one of the GPRM's, or the button may initiate a navigation command. For example, the button command may have its auto-action property set to false, but is forcibly activated after, say the twenty-fifth frame of the menu sequence. For instance, there may be from about 1 button area to about 10 button areas within a single VOB file using this technique. The buttons may be programmed to have a duration as short as 0.5 seconds, or as long as 1 second, and they may be embedded in a video sequence as short as 0.5 seconds or as long as about 10 seconds.

As used herein, the term "optical article" refers to an article that includes an optical data layer for storing data. The stored data may be read by, for example, an incident laser of an optical data reader device such as a standard compact disc (CD) drive or digital versatile disc (DVD) drive as are commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage. In one embodiment, the first surface of the optical article comprises a polycarbonate.

As mentioned above, the mark includes an optical-state change material disposed on a sector. In one embodiment, the optical-state change material comprises a dye or a reactive material. As used herein the term "optical-state change" material is used to describe a material which is capable of existing in at least two different forms, each form possessing an unique optical state, for example a unique wavelength associated with a maximum optical absorbance within a range from about 200 nm to about 800 nm, or a unique extinction coefficient at a specific wavelength between about 200 nm to about 800 nm. As used herein, the term unique means that each optical state is distinct and different from other optical states. Non-limiting examples of optical-state change materials include halochromic optical-state change materials, polymeric materials, organic compounds, hydrogels, liquid crystalline materials, leuco dyes, inorganic compounds such as, but not limited to, metal oxides and organometallic compounds, materials capable of undergoing a sigmatropic bond rearrangement, and reactive adduct materials. In various embodiments, the optical-state change materials may undergo the optical-state change under the influence of: a thermal stimulus i.e., may be thermochromic; an electrical stimulus i.e., may be electrically responsive; or may be light sensitive i.e., may be photochromic. The term "thermochromic" as used herein describes materials that undergo either a reversible or an irreversible thermally induced color change. The term "electrically responsive" as used herein describes materials that undergo either a reversible or an irreversible electrically induced color change. The term "photochromic" as used herein describes materials that undergo either a reversible or an irreversible light induced color change.

One suitable halochromic optical-state change material that may be used in the mark is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the mark may contain a dye i.e., a pH responsive dye such as for example a triaryl methylene dye. One example of a triaryl methylene dye is the sodium salt of bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the mark. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

As used herein, the term "chromic dye" describes optical-state change dyes which can exist in two different color forms between about 200 nm to about 800 nm. In one embodiment, the chromic dye is a triarylmethylene dye. Suitable non-limiting examples of triarylmethylene dyes include bromocresol green, bromocresol purple, and corresponding salts thereof. In another embodiment, the dye may include xanthenes, thiazines, oxazines, lactones, fulgides, spiropyrans, cyanine, and diarylethenes. Non-limiting examples of such dye compounds can include, but are not limited to, methylene blue, toluidine blue, Rose Bengal, erythrosine B, eosin Y, and fluorone dyes.

Non-limiting examples of dyes that can be used include bromocresol green, bromocresol purple, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine.

In general, the mark may be in one of a first optical state or a second optical state. As mentioned above, in one embodiment, the first control logic may be read only when the mark is in the first optical state. In another embodiment, when the mark is in a first optical state the mark may be opaque or un-bleached and when the mark is in the second optical state the mark may be transparent or bleached. In one embodiment, when the mark is in a first optical state the mark may be transparent or bleached and when the mark is in the second optical state the mark may be opaque or un-bleached. In one embodiment, when the optically detectable marks are in the first optical state they may function to render the disc unreadable at the location of the mark and when the optically detectable marks are in the second optical state they may function to render the disc readable at the location of the mark. The mark may render the optical article partially or completely unreadable in the pre-activated state of functionality of the optical article. In the pre-activated state, the mark may act as a read-inhibit layer by preventing the incident laser light of an optical data reader from reaching at least a portion of the optical data layer and reading the data on the optical data layer. For example, the mark may absorb a major portion of the incident laser light, thereby preventing it from reaching the optical data layer to read the data. In one embodiment, this may prevent the player from executing a FOAC command and thereby alter the playback sequence (also known as navigation logic).

In one embodiment, when the mark is in the first optical state the optical article may be considered to be in a pre-activated state of functionality i.e., the mark is non-bleached and when the mark is in the second optical state the optical article may be considered to be in an activated state of functionality, i.e., the mark is bleached. The difference in the percent optical reflectivity or the percent reflectivity of at least one portion of the optical data layer in the pre-activated state of functionality and the activated state of functionality may be at least about 10 percent. In one embodiment, the difference in the percent optical reflectivity or the percent reflectivity of at least one portion of the optical data layer in the pre-activated state of functionality and the activated state of functionality may be in a range from about 10 percent to about 15 percent, from about 15 percent to about 20 percent, or from about 20 percent to about 25 percent, or from about 25 percent to about 30 percent or from about 30 percent to about 40 percent. It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

In various embodiments, the optical article comprising the mark may be transformed from a pre-activated state of functionality to an activated state of functionality. Conversion from the pre-activated state of functionality to the activated state of functionality is achieved by the activation of the mark, which is deposited in or on the optical article, such that the mark allows optical communication with the optical data layer. As used herein, the term optical communication refers to transmission and reception of light by optical devices, such as CD players. The mark may be activated by interacting with one or more stimuli, for example, an electrical stimulus, a thermal stimulus, or an optical stimulus applied to the mark. In one embodiment, the mark is capable of irreversibly altering the state of functionality of the optical article. In the pre-activated state, at least one portion of the data from the optical data layer is unreadable by the incident laser light of an optical data reader device, however, this same portion of data can be read from the optical data layer in the activated state of functionality.

As used herein, the term "pre-activated" state of functionality refers to a state of functionality of the optical article where the mark has not yet been exposed to one or more external stimuli, while the "activated" state refers to a state of functionality where the mark has been exposed to the external stimuli. In one embodiment, the "pre-activated" state comprises at least one mark which inhibits portions of the optical data layer that are located directly in the optical path of the incident laser light of an optical data reader from being read. The "activated" state comprises a state of the optical article where the optical data layer can be read by the optical data reader as a result of the article being exposed to the laser light of a player.

In another embodiment, the at least one mark is at least partially transparent to the incident laser light of an optical data reader in the pre-activated state, allowing the data on the optical layer located directly in the optical path of the laser light to be read. In this embodiment, the mark at least partially absorbs the laser light from the optical data reader in the activated state and prevents the data directly in the optical path of the laser light from being read.

For example, in one embodiment the optical article comprises two marks, a first mark having an optical absorbance greater than about 0.35 in the "pre-activated" state (a mark with absorbance of 0.35 at the wavelength of the laser light partially absorbs the laser light such that the reflectivity of the optical article may be about 45 percent), and the second mark having an optical absorbance less than about 0.35 in the "pre-activated" state. Upon activation, the optical article may be converted to the "activated" state where the optical properties of only the first mark may be transformed such that the optical absorbance may be less than about 0.35. In at least one embodiment the difference in optical absorbance between the first optical state and the second optical state of the mark is at least 0.1.

In one embodiment, the plurality of optically detectable marks may be placed on the optical article by placing an ink composition on the optical article using methods known to one skilled in the art, such as for example, the screen-printing method, ink-jet printing method, directwrite, pad printing, microarray deposition, capillary dispense, gravure printing, thermal transfer printing, and adhesion of pre-made polymer films. In one embodiment, the placing a plurality of optically detectable marks is carried out on a first surface i.e., the same layer of the optical article.

In various embodiments, the mark may be deposited in a discrete area on the optical article, such that at least one mark, at least one line, at least one radial arc, at least one patch, a continuous layer, or a patterned layer extends across at least a portion of the optical article. One or more marks may be deposited on the optical article in various forms, such as a discrete portion, a continuous film, or a patterned film.

Alternatively, instead of being deposited on the surface of the optical article, the mark may be deposited inside the structure of the optical article. In optical storage articles, the mark may be deposited in the substrate on which the optical data layer is deposited. In such an embodiment, an ink composition used to deposit the mark may be mixed with the substrate material of the optical article. In alternate embodiments, the mark may be deposited between the layers of the optical article, or may be deposited within a layer of the optical article. For example, the ink composition may be incorporated in the UV curable adhesive of the bonding (spacer) layer. It should be appreciated that these marks should be sufficiently thermally stable to withstand the manufacturing temperatures of the optical article. Also, these marks may absorb the wavelength of the laser light in one of the activated, or the pre-activated state of the optical article. Upon being inserted into a player, the mark present inside the substrate may change color. As a result, the substrate may become transparent to the laser light, thereby facilitating the transmittance of laser light through the substrate in the future and making the optical article readable.

In one embodiment, a portion of the first content may be located within a physical data track, which is at least partially covered by the mark. The first content may be placed on the same layer that may be in close physical proximity to the printed mark such that the mark that covers at least a portion of the first control logic is activated i.e., bleached, by a portion of a defocused laser beam incident on the portion of the first content and on a portion of the mark. Since the first control logic and the first content are contained in the same layer and the bleaching of the mark may be referred to as adjacent bleaching.

In one embodiment, the optical article may include more than one layer such as for example a dual layer DVD-9 disc. In another embodiment, the first control logic may be located in a first layer, and a portion of the first content may be located on a second layer and wherein a portion of the first content is located directly under the first control logic and wherein at least portion of the first control logic is covered by the mark. For example the first control logic may be located on layer 0, and a portion of the first content is located within a physical data track that may be physically located on layer 1 directly underneath the printed mark that covers the first control logic. Since the first content may be physically located in a layer placed underneath the layer containing the first control logic, and is placed directly beneath the first control logic the bleaching of the mark may be referred to as underneath bleaching. In one embodiment, the bleaching of the mark may occur unnoticed by the viewer when the optical article is inserted in the optical article reader.

In yet another embodiment, the first control logic may be located on a second layer, and a portion of the first content may be located on a first layer with a portion of the first content located directly above the first control logic and the first control logic being covered by the mark. For example the first control logic may be located on layer 1, and a portion of the first content located within a physical data track that may be physically located on layer 0 directly above the printed mark that covers the first control logic. They may be arranged such that a portion of the defocused laser beam at the surface of the optical article is incident a portion of the printed mark that covers the first control logic while reading the portion of the first content, in order to bleach the marks. Since the first content may be physically located in a layer placed above the layer containing the first control logic, and is placed directly above the first control logic, the bleaching of the mark may be referred to as over-the-top bleaching. In one embodiment, the first control logic and the first content in an optical article may be so located that the optical article may be activated using a combination of the adjacent, underneath and over-the-top bleaching. This may help to maximize the time that the laser beam is incident upon the mark.

In one embodiment, the at least one sector may further contain a second control logic configured to set a non-default value for a second register using a forced activation button command to be read before the sector containing the first control logic. The second control logic may include a second command to be read sequentially after the sector. The second command is configured to direct the player to skip the sector with the first control logic and play the second content on the article if the second register is set to a default value, and to direct the player to go to the sector containing the first control logic if the second register is set to a non-default value. As explained, the second control logic functions as a pre-test command to identify if the player is configured to execute the FOAC method. For instance, if a player may be unable to execute the FOAC command on the first control logic when the first sector is completely readable (mark may be completely bleached or disc may not be marked) the pre-test command may direct the player to skip the sector with the first control logic and play the second content. This may prevent a viewer from having to repeatedly watch the first content when they have a player that may not be able to execute the FOAC method.

In another embodiment, the at least one sector may in addition, include a title and a third command. The third command in the title may direct the player to play the second content. The third command may be located sequentially after the first control logic directing the player to play the second content, which is accessed in the event that there is a tracking failure during reading of the first control logic. The title and the third command may be accessed if the player skips while reading the first control logic. The combination of the title and the third command may also be known as the title trap. As explained, if the player "skips" upon encountering the mark, the tendency of the player is to jump i.e., move on to the next title sequence on the optical article. To prevent uncontrolled navigation of the disc, the third command in this title may then direct the player to go to the second content, such as for example, a movie title placed immediately after the third command and to play the second content.

In one embodiment, the optical article may include a third content. In one embodiment, the third content may be located logically between the first content and the second content. In another embodiment, the third content may be located physically between the first content and the second content. The third content may be located in the data spiral in the sectors physically located between the contents i.e., between the first and the second contents. Alternately the third content may be located between specific sectors on the article to position the content or sectors at the desired physical location on the article. In these embodiments, the third content functions as the padding content or buffer content to adjust the location or the spacing of sectors containing the second content. The location or the spacing of the sectors may be adjusted such that the first content may be at least partially covered by the mark irrespective of the location and size of the mark. This ensures that when the mark is bleached, the mark covering at least a portion of the first content is bleached and the player may be able to play the second content.

In another embodiment, the third content may include a content stream configured to adjust the first control logic to a defined spacing. The third content includes a content stream configured to adjust the first content or the second content to a defined physical location on the optical article. In still another embodiment, the third content may assist in moving the different sectors to the various locations, such as for example, the third content may help to space two or more sectors within the same FOAC command.

Another embodiment of the present disclosure is directed to an optical article for playback in a player. The optical article includes at least one sector comprising a first control logic. The first control logic includes a forced activation button command that is sequentially read before a second control logic by the player. The first control logic directs the player to navigate to a first content on the article. The optical article also includes a second command to direct the player to play a second content, wherein the second command is skipped by the player if the first content is played. The optical article includes a mark containing an optical state change material disposed on the sector, wherein the mark is in one of a first optical state or a second optical state, and wherein the first control logic can be read only when the mark is in the second optical state.

In one embodiment, the second control logic i.e., a pre-test logic comprising a navigation command to be read before the sector, configured to direct the player to skip the sector with the first control logic and play the second content on the article if the navigation command is not activated, and to direct the player to go to the sector containing the first control logic if the navigation command is activated. In one embodiment, the at least one sector further comprises a title and a fourth command directing the player to play the second content. The fourth command may function in a similar manner as the third command described above i.e., like a title trap.

In some embodiments, at least a portion of the mark is coated with an optically transparent second layer. The optically transparent second layer serves as a protective coating for the mark from chemical and/or physical damage. The optically transparent second layer may contain cross-linkable materials that can be cured using ultraviolet (UV) light or heat. Furthermore, the optically transparent second layer may be a scratch resistant coating. For example, the optically transparent second layer may include, but is not limited to, a matrix consisting of cross-linkable acrylates, silicones, and nano silicate particles.

Test DVD's may be made with the above described logic. In addition to the navigational properties, an option on the main menu may be chosen to iterate over the first control logic many times, which allows the player to bleach the mark over the first control logic. The control logic may be at the beginning of the disc logically. When the DVD is inserted in the player, the player may be configured such that the trailer or the feature may be played. The content may be located physically anywhere on the optical article. In one embodiment, the content may be located at a radius on layer 0 nearest to the center hub.

In one embodiment, the control logic and the commands used to execute the FOAC method in the optical article may be contained in more than one sector that may command the player to modify a GPRM register from 0 to 1. These sectors may be embedded within video data on the disc. More than one sector may be employed since the forced activation time may take approximately 1 second in a variety of players available in the market. In one embodiment, only 1 sector may be employed. In one embodiment, the sectors may be spaced approximately 250 logical sectors apart to allow the commands of the FOAC method to be spread over 1 second of real time. In another embodiment, the sectors may reside within a video sequence. In yet another embodiment, the sectors may reside in the center of the video sequence that is not at the beginning or not at the end of the video sequence. In one embodiment, one of the commands of the FOAC method may be located within 1 second into the video sequence, and another command of the FOAC method may be located within an additional 1 second beyond the previous command.

In one embodiment, the button checks (may also be referred to as "activation checks) may take about 5 seconds, during which the player can be displaying a first content on the screen. In another embodiment, the button checks may take less than about 5 seconds, or less than about 3 seconds or about 0.5 seconds during which the player can be displaying a first content on the screen.

In one embodiment, a mark with a photobleachable dye may be printed over the sectors. In one embodiment, the optical article may be programmed to navigate to the first content when a specified bit in a GPRM register is 0. In another embodiment, the optical article may be programmed to navigate to the first content when the GPRM register is non-activated, which would be the case on the first play if the mark is dark. In one embodiment, the disc may be programmed to navigate to the second content when a specified bit in a GPRM register is 1. In another embodiment, the optical article may be programmed to navigate to the second content when the GPRM register is activated, which would be the case on subsequent plays if the mark has been bleached. In another embodiment, the exact spacing of the sectors may be adjusted so that the mark may cover both sectors, which allows for an easier print with less material.

In one embodiment, an additional control logic and command (also known as the pre-test command) may be included on the optical article, which may act as a control. In one embodiment, the additional control logic and command may be contained in two sectors. In another embodiment, the additional command may be placed at a physical location such that a mark over the button check may not interfere with the pre-test control logic. In one embodiment, the additional command may be placed at a physical location of at least about 1 millimeter radially or at least about 2 millimeter radially from the printed mark. The additional command may be used to check if the player will properly respond to the FOAC method during playback. When the optical article player is unable to execute the FOAC method, a logic may be written to default to play the second content, without having to play the first content.

Referring to FIG. 1, a logical layout of content (10) in an optical article is provided. In FIG. 1 is also shown an optical article (12) indicating a sector (14) where the third control logic (button 1) is not obscured by a mark and a sector (16) where the first control logic (button 2) is obscured by a mark containing a light-sensitive dye. Once the optical article is inserted in the player, the player may perform the function of activating button 1 (17), the pre-test command. The player then checks if the button 1 is activated (18).

If the button 1 is not activated (22) the player plays the second content (24), for example a movie. This allows normal playback in players that do not implement the FOAC commands. If the button 1 is activated (20) the player then moves on to at least to read the sector containing a command to activate the button 2 (21), the first control logic. This is the first control logic described above. The player then checks if the button 2 is activated (26).

If the button 2 is activated (28) the player plays the second content (30). This indicates that no mark is obscuring the first control logic, or that the mark is in a transparent state. If the button 2 is not activated (32) the player plays the first content (38), for example a trailer, and then continues to play the second content (40). This occurs when any mark on the first control logic is in an opaque state.

The optical article may undergo manual iteration of playback (42) and the player once again follows the sequence of reading the sector to activate button 2 and checking for the activation of button 2.

A manual iteration may be used to force the player to bleach the mark. For example, a 5 s video may be cycled through during the second button check and the number of checks that the players take before the FOAC command is readable by the player is measured. In one embodiment, the player follows this sequence without manual iteration. For instance at the end of the feature, when the viewer selects the stop button, the disc may go through a sequence where it attempts to read button 2. The disc may be programmed to keep reading button 2 until the player activates button two at least five times. This may ensure that the mark may be bleached and hence when the viewer watches the feature for a second time, the player may move on directly to the second content.

If the player skips during the activation of button 2 the player jumps to a title trap (34). As explained above, title trap prevents uncontrolled navigation of the disc by directing the player to jump to a title i.e. the title trap if the player "skips" to the next title sequence on the optical article upon encountering a mark that obscures the second content. The player then moves on to play the second content (36).

Figure 2:
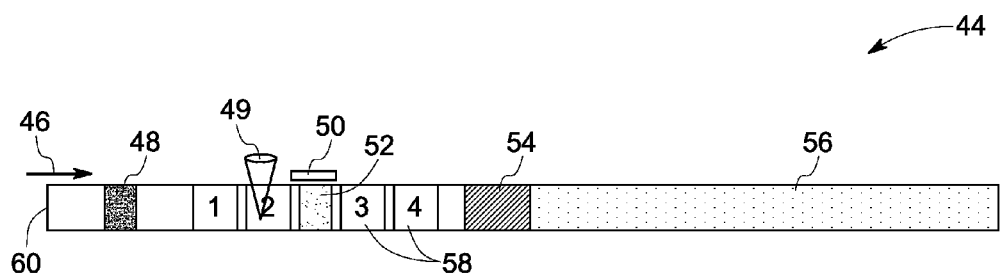
FIG. 2 shows a layer of an optical article indicating adjacent bleaching in accordance with an embodiment described herein.

Referring to FIG. 2, a section (44) of layer 0 (60) of an optical article DVD5 is shown. The layer indicates a FOAC pre-test command (48) that is not obscured by a mark. Indicated on the layer is the first content (58), for example trailers 1 to 4, and a mark (50). The mark is placed such that it covers the first control logic (52) and a part of the trailers 1 to 4. The arrow (46) indicates the direction in which the laser light indicated by cone (49) of the player moves over the section of layer 0 from the center to the outer edge of the optical article. The main menu (54) and the second content (56) for example a movie, are indicated on the optical article. Since the first control logic and the second content are contained in the same layer and the bleaching of the mark occurs when the optical article is read by the player, the bleaching is referred to as "adjacent" bleaching.

Figure 3:
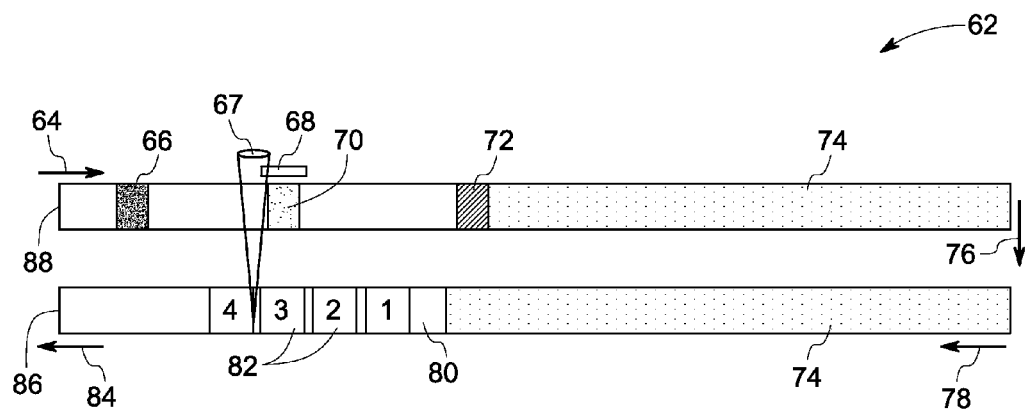
FIG. 3 shows a layout of an optical article indicating underneath bleaching in accordance with an embodiment described herein.

Referring to FIG. 3, a section (62) of layer 0 (88) and layer 1 (86) of an optical article DVD9 is illustrated. The layer 0 indicates a FOAC pre-test command (66) that is not obscured by a mark. The mark (68) is placed over the first control logic (70) in the layer 0. The layer 0 also includes the main menu (72) and the second content (74) for example a movie. Indicated on the layer 1 is the first content (82), for example trailers 1 to 4, and the second content. The mark is placed such that it covers the first control logic in layer 0 and a part of the trailers set numbered 1 to 4 in layer 1. The arrows (64, 76, 78, and 84) indicate the direction in which the laser light (67), indicated by a cone, of the player moves over the sections of layer 0 and layer 1 from the center to the outer edge and back to the centre of the optical article. The layer 1 also includes a third content (80). The third content functions as a padding or a buffer to adjust the location and spacing of the trailers 1 to 4. Since the first content may be physically located in a layer placed underneath the layer containing the first control logic, and is placed directly beneath the first control logic the bleaching of the mark may be referred to as "underneath" bleaching.

Figure 4:
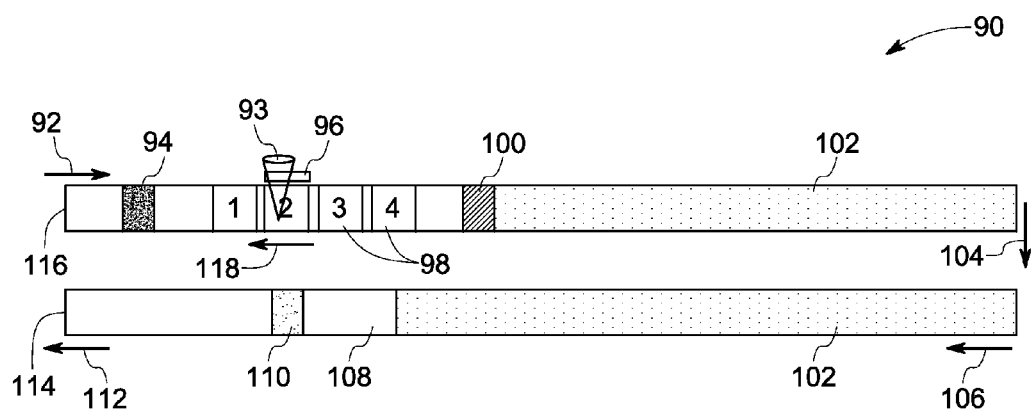
FIG. 4 shows a layout of an optical article indicating over-the-top bleaching in accordance with an embodiment described herein.

Referring to FIG. 4, a section (90) of layer 0 (116) and layer 1 (114) of an optical article DVD9 are shown. The layer 1 indicates a first control logic (110), a second content (102) for example a movie, and a third content (108). The third content functions as a padding or a buffer to adjust the location and spacing of the sector containing the first control logic. The layer 0 includes a FOAC pre-test command (94) that is not obscured by a mark (96), a first content (98), for example trailers 1 to 4, a main menu (100) and the second content (102) for example a movie. The arrows (92, 104, 106, 112, and 118)

indicate the direction in which the laser light (93) indicated by a cone of the player moves over the sections of layer 0 and layer 1 from the center to the outer edge and back to the center of the optical article. Since the first content may be physically located in a layer placed above the layer containing the first control logic, and is placed directly above the first control logic, the bleaching of the mark may be referred to as "over-the-top" bleaching.

Figure 5:
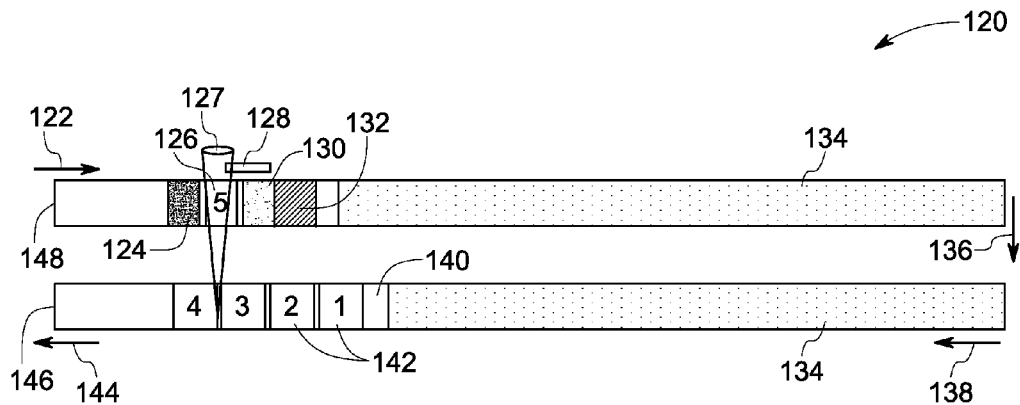
FIG. 5 shows a layout of an optical article indicating a combination of adjacent and underneath bleaching in accordance with an embodiment described herein.

Referring to FIG. 5, a section (120) of layer 0 (148) and layer 1 (146) of an optical article DVD9 is shown. The layer 0 indicates a FOAC pre-test command (124) that is not obscured by a mark. The layer 0 also includes a trailer 5 (126), a first control logic (130), a main menu (132) and a second content (134). The mark (128) is placed over the optical article. The layer 1 includes trailers 1 to 4 (142), a second content (134) and a third content (140). The mark is placed such that it cover the first control logic, at least a portion of first content trailer 5 in the layer 0, at least a portion of the main menu and at least a portion of trailers 1 to 4 in layer 1. The arrows (122, 136, 138 and 144) indicate the direction in which the laser light (127), indicated by a cone, of the player moves over the sections of layer 0 and layer 1 from the center to the outer edge and back to the center of the optical article. The third content functions as a padding or a buffer to adjust the location and spacing of the trailers 1 to 4. Since the first control logic, at least a portion of trailer 5 and at least a portion of trailers 1 to 4 are obscured by the mark, the mark is activated using a combination of adjacent and underneath bleaching during playback of the first content. Also, in this figure, since a portion of the main menu covered by the mark, additional adjacent bleaching may take place while the player may be at the main menu during playback. This illustrates that in certain embodiments, bleaching is not necessarily limited to playback of the first content, it may be done during menu playback or even during the playback of the second content.

Figure 6:
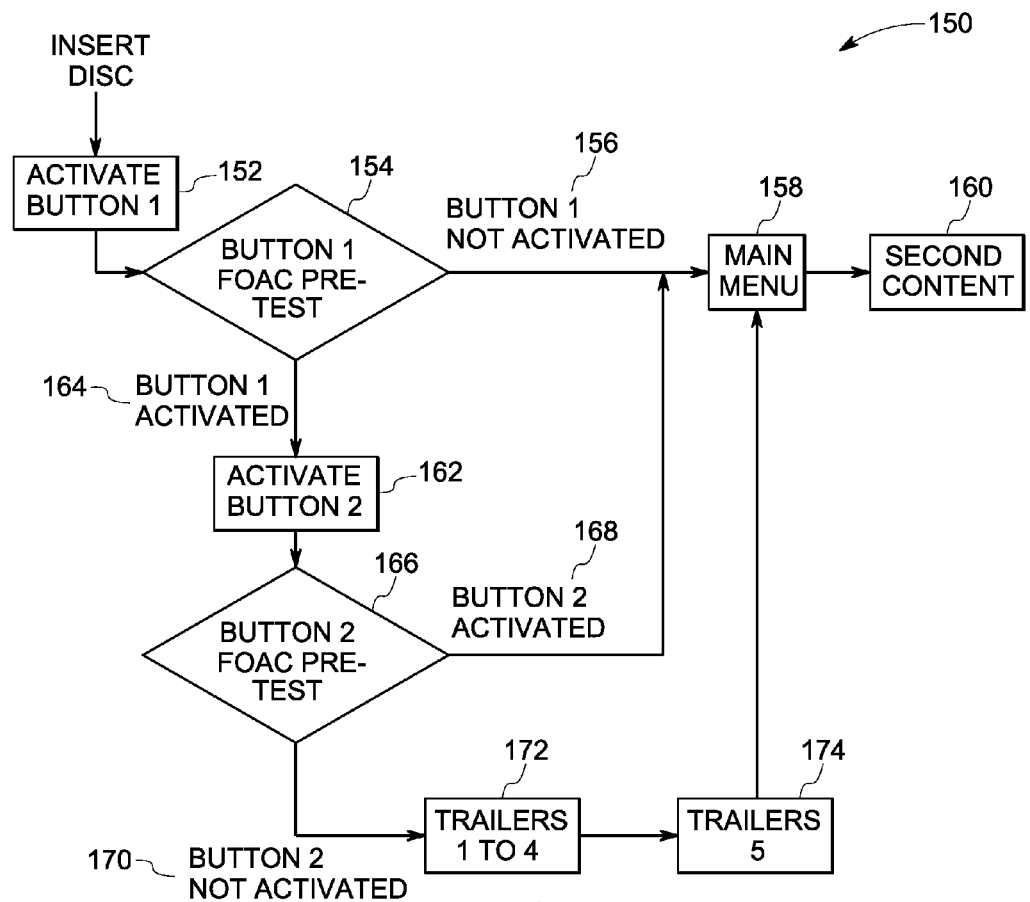
FIG. 6 shows a logical layout of an optical article in accordance with an exemplary embodiment described herein.

Referring to FIG. 6, a logical layout of content (150) in an optical article is provided. An optical article (not shown in the figure) having a sector where the first control logic is not obscured by a mark and another sector where the first control logic is obscured by a mark containing a light-sensitive dye is inserted in a player. The player is instructed to perform the function of activating button 1 (152), the pre-test command. The player then checks if the button 1 is activated (154). If the button 1 is not activated (156) the player moves on to the main menu (158) on the optical article and from where the player may be directed to play the second content (160), for example a movie. If the button 1 is activated (164) the player then moves on to attempt to read the sector containing the command to activate the button 2 (162). The player then checks if the button 2, the first control logic, which is obscured by the mark (166) is activated. If the button 2 is activated (168) the player moves on to the main menu from where the player may be directed to play the second content. If the button 2 is not activated (170) the player plays the trailers 1 to 4 (172) and the trailer 5 (174), and the player then moves on to the main menu and thereafter to play the second content. The logical layout described in FIG. 6 corresponds to the physical layout shown in FIG. 5. In the logical layout described above, the main menu may contain video sequences containing a main menu introduction and a main menu sequence (not shown in figure).

In another embodiment, the optical article includes a first file comprising a first control logic, and a second file comprising a second control logic. The first file is configured to direct the player to play a first content data stored on the optical article, when the first control logic is read by the player. The player is directed to read the second file if the player cannot read the first file. The second file is configured to direct the player to play a second content data stored on the article when the second control logic is read by the player. The optical article includes a mark containing an optical state change material disposed on at least a portion of the first file, wherein the mark is in one of a first optical state or a second optical state, and wherein the first control logic can be read only when the mark is in the second optical state.

In one embodiment, the first file may be an information file (also sometimes referred to as "IFO") and the second file may be a backup file (also sometimes referred to as "BUP"). In one embodiment, the IFO and BUP are substantially as disclosed in a typical DVD specification. This method of reading the optical article may be referred to as the IFO-BUP method. In one embodiment, the BUP file may be a backup of the IFO file on an optical article, which may contain information about the organization of tracks, menus, chapters, subtitles, audio tracks and the like on the optical article.

The first file and the second file may contain different command structures. In one embodiment, first file and the second file may contain different navigational command structures. In one embodiment, the first control logic is configured to direct the player to play a first content data stored on the article, and the second control logic is configured to direct the player to play a second content data stored on the article In another embodiment, first file and the second file may contain different GPRM command structures, with the subsequent navigational commands located outside of the first and the second files. The second file may include a command to adjust the value of a register to a non-default value when the second control logic is read by the player. In this case the navigation command to direct the player to play the first content on the article if the register is set to a default value, and to play the second content on the article if the register is set to the non-default value.

In one embodiment, the optical article may contain a title placed after the first control logic and the second control logic, and a second navigation command directing the player to play the second content. The title is a feature similar to the title trap discussed above for the forced activation method. If the IFO and BUP files pertain to one video title set (VTS), the first title of the next VTS could be used for a title or a title trap.

All the embodiments for the mark and for the optical article of the IFO-BUP method may be similar to the embodiments of the mark and the optical article discussed above for the forced activation method.

Figure 7:
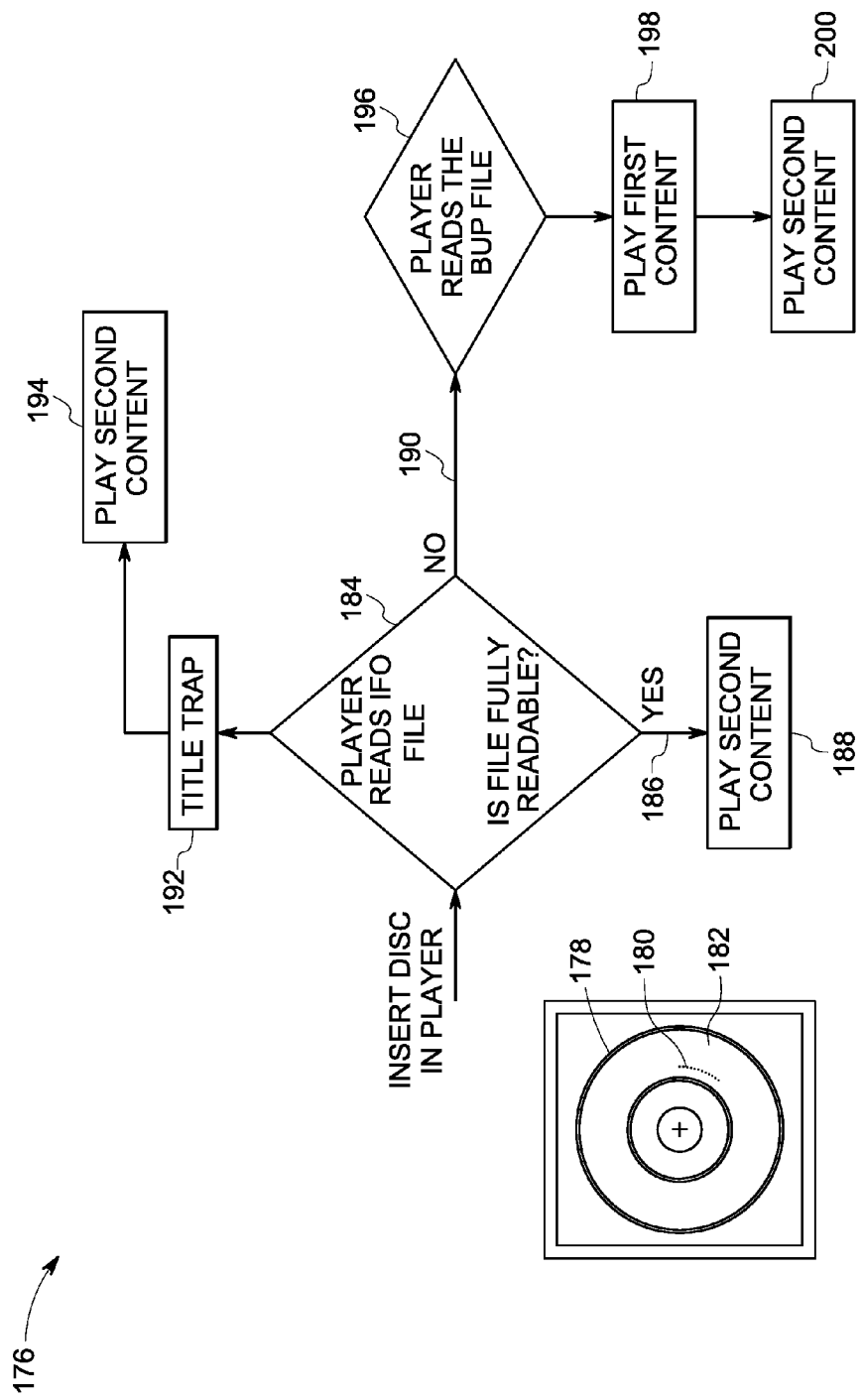
FIG. 7 shows a logical layout of content in an optical article in accordance with an embodiment described herein.

Referring to FIG. 7, a logical layout of content (176) in an optical article is provided. In FIG. 7 is also shown an optical article (178) indicating a sector (180) where the IFO file containing the first control is partially obscured by a mark containing a light-sensitive dye and a sector (182) where the BUP file containing the second control is not obscured by a mark. Once the optical article is inserted in the player, the player may perform the function of reading the IFO file (184). If the file is fully readable (186) the player moves on to play the second content (188) for example a movie. If the file is not fully readable (190) the player moves on to play the BUP file (196), where the player reads the first content (198) for example a trailer and then the second content (200) for example a movie. If the player skips while reading the IFO file the player jumps to a title trap (192). The player then moves on to play the second content (194).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical article for playback in a player comprising:
   a hardware article including at least one optical data layer;
   a first content stored on the hardware article;
   a second content stored on the hardware article;
   a control logic stored on the hardware article;
   a file stored on the hardware article, wherein the file is configured to adjust a value of a register from a default value to a non-default value when the control logic is read by the player, and wherein the file is configured to direct the player to play the second content without playing the first content when the register is set to the non-default value and to play the first content and then the second content when the register is set to the default value; and
   a mark comprising an optical state change material disposed in or on a surface of the hardware article such that the mark covers at least a portion of the control logic, wherein the mark is in one of a first optical state and a second optical state, and wherein the control logic can be read by the player only when the mark is in the second optical state.

2. The optical article of claim 1, wherein the file is configured to direct the player based on a first navigation command that is located away from the file.

3. The optical article of claim 1, comprising:
   a pre-test control logic stored on the hardware article that is not obscured by the mark; and
   a pre-test file stored on the hardware article, wherein the pre-test file is positioned on the hardware article such that it is read prior to the file, and wherein the pre-test file is configured to direct the player to play the second content without playing the first content when a command of the pre-test control logic is not implemented.

4. The optical article of claim 3, further comprising a title placed after the pre-test control logic and the control logic, and a navigation command directing the player to play the second content.

5. The optical article of claim 1, wherein a portion of the first content is located within a physical data track which is at least partially covered by the mark.

6. The optical article of claim 5, wherein the mark is configured to be bleached by a portion of a defocused laser beam incident on the mark.

7. The optical article of claim 1, wherein the optical article comprises more than one layer.

8. The optical article of claim 7, wherein the control logic is located on a first layer, and a portion of the first content is located on a second layer and wherein a portion of the first content is located directly under the control logic.

9. The optical article of claim 7, wherein the control logic is located on a second layer, and a first portion of the first content is located on a first layer and wherein a second portion of the first content is located directly above the control logic.

10. The optical article of claim 1, further comprising a third content located between the first content and the second content.

11. The optical article of claim 10, wherein the third content comprises a content stream configured to adjust the control logic to a defined spacing.

12. The optical article of claim 10, wherein the third content comprises a content stream configured to adjust the first content or the second content to a defined physical location on the optical article.

13. The optical article of claim 1, wherein the optical state change material is sensitive to an external stimulus.

14. The optical article of claim 1, wherein the control logic is configured to instruct the player to initiate its own button activation.

15. A method, comprising:
   storing a first content on an optical article;
   storing a second content on the optical article;
   storing a control logic on the optical article, wherein the control logic is configured to adjust a value of a register from a default value to a non-default value when read by a player;
   storing a file on the optical article, wherein the file is configured to direct the player to play the second content without playing the first content when the register is set to the non-default value and to play the first content and then the second content when the register is set to the default value; and
   positioning a mark on or in the optical article such that the mark obscures the control logic, wherein the mark comprises an optical state change material that changes from a first optical state to a second optical state when exposed to a particular stimulus, and wherein the control logic can be read by the player only when the mark is in the second optical state.

16. The method of claim 15, comprising:
   storing a pre-test control logic on the optical article without obscuring the pre-test control logic with the mark; and
   storing a pre-test file on the optical article in a position such that it is read prior to the file, and wherein the pre-test file is configured to direct the player to play the second content without playing the first content when a command of the pre-test control logic is not implemented.

17. A method of player operation, comprising:
   performing a first scan of an optical article with a light beam, wherein the first scan does not result in reading a control logic stored on the optical article due to a mark including optical state change material that obscures the control logic;
   bleaching the mark with the first scan such that the control logic will be readable during a second scan;
   receiving instructions from a file stored on the optical article;
   implementing the instructions by accessing and playing a first content and then a second content stored on the optical article when the control logic is not read;
   performing a second scan of the optical article with the light beam, wherein the second scan results in reading the control logic through the bleached mark; and
   implementing the instructions by accessing and playing the second content without playing the first content when the control logic is read by a content player.

* * * * *